L. C. SMITH.
NUT LOCK.
APPLICATION FILED NOV. 12, 1908.
916,210.
Patented Mar. 23, 1909.
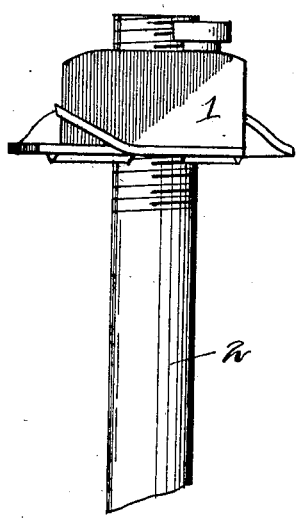
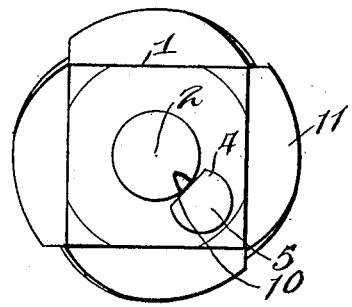
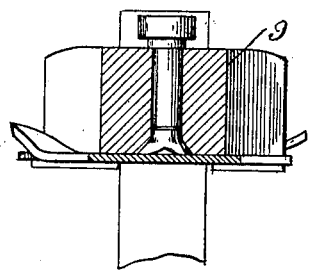
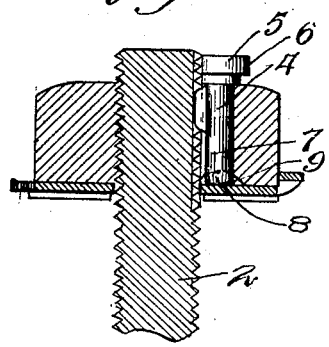
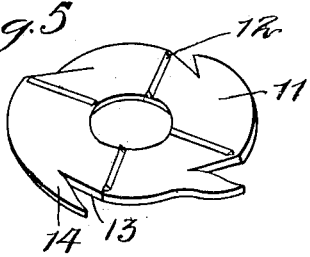
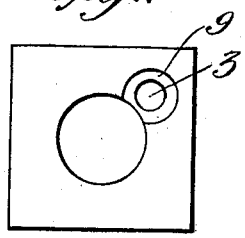
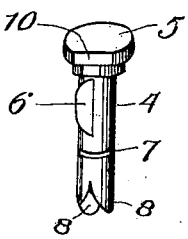
Witnesses
Addison K. Smith
D. W. Gould
Inventor
Leonidas C. Smith.
By Victor J. Evans
Attorney

UNITED STATES PATENT OFFICE.

LEONIDAS C. SMITH, OF POLKTON, NORTH CAROLINA.

NUT-LOCK.

No. 916,210.  Specification of Letters Patent.  Patented March 23, 1909.

Application filed November 12, 1908. Serial No. 462,266.

*To all whom it may concern:*

Be it known that I, LEONIDAS C. SMITH, a citizen of the United States, residing at Polkton, in the county of Anson and State of North Carolina, have invented new and useful Improvements in Nut-Locks, of which the following is a specification.

The invention relates to an improvement in nut locks, being particularly directed to a construction whereby the nut may be so fixed with relation to the bolt as to prevent unscrewing movement of the nut except under manual manipulation of the latter.

The main object of the present invention is the provision of a locking key adapted to be inserted in the nut and to be secured therein by the force required for its insertion, the key being adapted to engage the bolt to prevent independent movement of the nut relative to the bolt.

The invention will be described in the following specification, reference being had particularly to the accompanying drawings, in which:—

Figure 1 is a view in elevation illustrating the improvement. Fig. 2 is a plan of the same. Fig. 3 is a vertical section with the locking key in elevation. Fig. 4 is a sectional view through the nut showing the locking key in elevation at right angles to the position shown in Fig. 3. Fig. 5 is a perspective view of the washer. Fig. 6 is a perspective view of the locking key. Fig. 7 is a bottom plan of the nut.

Referring particularly to the drawings, my improved nut lock is designed for use in securing a nut 1 in position upon a bolt 2, the nut being arranged for usual threaded coöperation with the bolt and both of said parts being, except in the particulars hereinafter noted, of any usual or preferred construction. In carrying out the invention the nut 1 is formed immediately adjacent the bolt bore therein with an opening 3 which extends throughout the height of the nut in parallelism with the bolt bore, the opening 3, which will be hereinafter termed the pin bore, is so arranged relative to the bolt bore that the threads of the bolt when in position in the nut will coincide with the wall of the pin bore. A locking pin 4 is adapted for insertion in the pin bore 3, said pin being formed at the upper end with a head 5 and below said head with a radially extending blade 6. Below the blade the pin is circumferentially grooved or channeled at 7 to form a weakened point, and the lower end of the pin is divided to provide spaced flexible projections 8. The relatively lower end of the pin bore is enlarged or countersunk at 9, and the peripheral edge of the head 5 of the pin is cut away in vertical alinement with the blade 6, as at 10, to provide for the insertion of the pin without interfering with the bolt.

In connection with the pin I use a washer 11 designed to be arranged on the bolt beneath the nut and having on its lower side a series of radial cutting projections 12 to bite into the material with which the bolt is connected. The peripheral edge of the washer is formed with a series of V-shaped recesses 13 to form tongues 14, which are thus of spring character and are normally bent upwardly to be successively engaged by the diagonal points of the nut to assist in preventing a return movement of the nut.

In use the washer is applied as shown and the nut screwed upon the bolt until in binding contact with the washer, the revolution of the nut causing the diagonal points thereof to override the spring tongues 14. The tongues are so formed that after such movement of the nut said tongues will spring back to normal position to engage the edges of the nut and tend in a measure to prevent return of the same. The pin is then inserted in the pin bore with the blade toward the threads of the bolt. The pin is driven home in any desired manner causing the blade to cut its way through the threads of the bolt, forming therein a longitudinal kerf in which the blade seats, thereby locking the bolt and nut together. As the pin is driven to its seat the branch lips 8 at the lower end of the pin engage the upper surface of the washer 11 and are spread into the countersunk portion 9 of the pin bore, thereby locking the pin against displacement from the nut.

When it is desired to remove the pin in proper form any tool is inserted beneath the head 5 and the pin is forced from the pin bore by a prying operation. If the lips 8 fail to yield under such operation to permit movement of the entire pin, said pin will be fractured at the weakening line 7 after which its withdrawal may be conveniently accomplished.

The various parts may be constructed of such material as desired, the sole requirement being that the lips 8 of the locking pin, being capable of spreading under the driving pressure, and the blade 6 be of such material that it will readily cut its way through the bolt.

Having thus described the invention what is claimed as new, is:—

1. The combination with a bolt and nut arranged to coöperate with the bolt, said nut being formed with a pin bore arranged adjacent the bolt bore, of a locking pin adapted to be forced into the pin bore, a blade carried by said pin adapted to cut into the bolt threads during the insertion of the pin, said pin being formed with divergent lips adapted to be spread during the insertion of the pin to lock the latter to the nut, and a washer arranged to engage the bolt beneath the nut and to serve as a base for the spreading of the lips in the insertion of the pin.

2. The combination with a bolt and nut arranged to coöperate with the bolt, said nut being formed with a pin bore arranged adjacent the bolt bore, of a locking pin adapted to be forced into the pin bore, a blade carried by said pin adapted to cut into the bolt threads during the insertion of the pin, said pin being formed with divergent lips adapted to be spread during the insertion of the pin to lock the latter to the nut, and a washer arranged to engage the bolt beneath the nut and to serve as a base for the spreading of the lips in the insertion of the pin, said washer having a series of spring tongues to engage the side edges of the nut to prevent turning of the nut in one direction and being formed on the under side of the same with a series of radial cutting projections to bite into the material with which the bolt is connected, and prevent the washer from turning in any direction.

In testimony whereof I affix my signature in presence of two witnesses.

LEONIDAS C. SMITH.

Witnesses:
D. A. CARTER,
T. M. SMITH.